United States Patent [19]

Baur et al.

[11] Patent Number: 5,565,141
[45] Date of Patent: Oct. 15, 1996

[54] SOLUBILIZER MIXTURE FOR THE PREPARATION OF STRONGLY ALKALINE AQUEOUS SOLUTIONS OF NON-IONIC SURFACTANTS

[75] Inventors: Richard Baur, Mutterstadt; Dieter Stoeckigt, Ludwigshafen; Hans-Werner Neumann, Reilingen, all of Germany

[73] Assignee: BASF Aktiengesellschaft, Ludwigshafen, Germany

[21] Appl. No.: 325,344

[22] PCT Filed: Apr. 27, 1993

[86] PCT No.: PCT/EP93/01012

§ 371 Date: Oct. 31, 1994

§ 102(e) Date: Oct. 31, 1994

[87] PCT Pub. No.: WO93/23158

PCT Pub. Date: Nov. 25, 1993

[30] Foreign Application Priority Data

May 11, 1992 [DE] Germany ............... 42 15 390.5

[51] Int. Cl.$^6$ ............... C11D 1/66; C11D 10/04; C11D 17/08; B01J 13/00

[52] U.S. Cl. ............... 252/312; 252/356; 580/535
[58] Field of Search ............... 252/351, 356, 252/117, 108, 156, DIG. 14, 546, 312, 174.21, 89.1, 173

[56] References Cited

U.S. PATENT DOCUMENTS

| Re. 35,115 | 12/1995 | Winston et al. | 252/174.21 |
|---|---|---|---|
| 3,947,382 | 3/1976 | Kelly et al. | 252/546 |
| 3,956,161 | 5/1976 | Woodward | 252/156 |
| 4,082,684 | 4/1978 | Kreischer | 252/DIG. 14 X |
| 4,126,572 | 11/1978 | Tai | 252/DIG. 14 X |
| 4,212,760 | 7/1980 | Baur et al. | 252/156 |
| 4,321,166 | 3/1982 | McGrady | 252/542 |
| 4,915,864 | 4/1990 | Kita et al. | 252/117 |
| 5,264,047 | 11/1993 | Winston et al. | 252/174.21 |
| 5,308,531 | 5/1994 | Urfer et al. | 252/174.17 |

Primary Examiner—Richard D. Lovering
Assistant Examiner—Daniel S. Metzmaier
Attorney, Agent, or Firm—Oblon, Spivak, McClelland, Maier & Neustadt, P.C.

[57] ABSTRACT

The use of a mixture of a long-chain, unsaturated, dimeric or oligomeric fatty acid with a $C_6$–$C_{12}$ fatty acid as solubilizer for non-ionic surfactants in alkaline aqueous solutions.

12 Claims, No Drawings

SOLUBILIZER MIXTURE FOR THE PREPARATION OF STRONGLY ALKALINE AQUEOUS SOLUTIONS OF NON-IONIC SURFACTANTS

The invention relates to the use of a solubilizer mixture for the manufacture of alkaline aqueous solutions of non-ionic surfactants.

Non-ionic surfactants cannot be readily incorporated in strongly alkaline surfactant formulations. On the contrary, they are salted out on account of the high content of electrolyte, ie, they form a phase distinct from the aqueous phase. Nevertheless incorporation of such surfactants is possible if a solubilizer is used. Well-suited solubilizers for this purpose are alkylaryl sulfonates, eg, cumene sulfonate, -ene—adducts of maleic anhydride on α-olefins, for example 1,2-dodecene, and Diels-Alder adducts of linoleic acid on acrylic acid (cf. U.S. Pat. No. 3,956,161).

DE-PS 2,754,831 also discloses the use of '-ene'-adducts of maleic anhydride on unsaturated fatty acids or their triglycerides.

The use of monocarboxylic acids having from 4 to 10 carbon atoms in cleaning formulations additionally containing base-reacting materials has been described in DE-OS 1,952,911. The usefulness of these solubilizers is, however, restricted to certain classes of surfactant and is further limited by the quantity of alkali which can be used.

It is thus an object of the invention to find a solubilizer which is suitable for as many types of surfactant as possible and which also makes it possible to manufacture formulations having higher contents of alkali.

We have found that mixtures of a long-chain, unsaturated, dimeric or oligomeric fatty acid with a $C_6$–$C_{12}$ fatty acid are, surprisingly, suitable for use as solubilizers. Particularly suitable are mixtures of from 60 to 95 wt % and preferably from 80 to 90 wt % of the $C_6$–$C_{12}$ fatty acid with from 5 to 40 wt % and preferably from 10 to 20 wt % of the long-chain, unsaturated, dimeric or oligomeric fatty acid, whilst mixtures of 2-ethylhexanoic acid or isononanoic acid with dimeric oleic acid or oligomeric oleic acids are preferred.

Suitable dimeric fatty acids are commercially available products such as the Henkel Empol® series or Unicherna Pripol® series. Generally speaking, dimeric and oligomeric $C_{10}$–$C_{22}$ mono- or poly-carboxylic acids are suitable which can be prepared by conventional methods and contain mainly dimers and trimers.

The manufacture of the solubilizer mixture of the invention takes place by mixing both acidic components at room temperature or elevated temperature in commercially available mixing devices.

The solubilizers of the invention are suitable for most non-ionic surfactants, in particular for the numerous commercial ethylene oxide adducts and propylene oxide adducts as well as their mixed adducts (mostly not random adducts, but adducts in block form) on mono-, di-, and poly-functional alcohols, amines and polyamines, amino alkohols, carboxylic acids, acid amides, or alkyl phenols, as well as for block polymers of ethylene oxide and propylene oxide, in which the propylene oxide can be wholly or partially replaced by butylene oxide.

By strongly alkaline aqueous solutions we mean those having a pH above 9 and preferably above 12. For economical reasons it is usually preferred to use caustic soda.

There is also the possibility of making aqueous solutions of said surfactants which contain the solubilizer mixture of the invention and have a pH ranging from neutral to weakly acid, ie in the range of approximately 4 to 7, in which state the said solutions can be stored and sold, the pH being raised to the aformentioned alkaline range just before or during use.

To test the efficacy of the solubilizers, they are mixed with from 0.1 to 1, and preferably from 0.3 to 1, pan by weight of surfactant per part of solubilizer, and these mixtures are in turn mixed with caustic soda of the desired concentration. It is then ascertained whether an optically clear solution having a high cloud point is formed.

The solubilizers are then used in practice according to the results obtained, while the relative quantity of caustic soda can vary of course.

In the following examples the parts and percentages are by weight.

EXAMPLES 5 parts of the solubilizers A to C are intermixed with 5 parts of a ($C_{13}$–$C_{15}$ oxoalkohol)ethoxylate (4 mol of propylene oxide and 2 mol of ethylene oxide per mole of fatty alcohol) and 10 to 15 parts of sodium hydroxide and water, with stirring, and assessed visually. Determination of the cloud points of the formulations provides further information on the solubilizing action.

Solubilizer A: 10 parts of oleic acid
  90 parts of 2-ethylhexanoic acid
Solubilizer B: parts of dimeric oleic acid ( 79% of dimer 19% of trimer)
  90 parts of 2-ethylhexanoic acid
Solubilizer C: 10 parts of dimeric oleic acid (75% of dimer 22% of trimer)
  90 parts of 2-ethylhexanoic acid

| | Tests carried out on alkaline formulations | | |
| --- | --- | --- | --- |
| | Solubilizer | | |
| Parts | A | B | C |
| 5 surfactant 5 solubilizer 5 sodium hydroxide 85 water | separated | clear 47° C. cloud point | clear 42° C. cloud point |
| 5 surfactant 5 solubilizer 10 sodium hydroxide 80 water | separated | clear 93° C. cloud point | clear 92° C. cloud point |
| 5 surfactant 5 solubilizer 15 sodium hydroxide 75 water | separated | clear >100° C. cloud point | clear 57° C. cloud point |

The examples show that no homogeneous formulation can be achieved using solubilizer A even at low sodium hydroxide concentrations.

Using the solubilizers B and C of the invention, the formulation obtained is stable and clear and has a high cloud point even when the alkali content is as low as 15 parts of sodium hydroxide.

Increasing the sodium hydroxide concentration of mixtures containing the solubilizers B and C of the invention still produces homogeneous formulations (limiting concentration of sodium hydroxide when using solubilizer A is 4.5 parts; for solubilizer B it is 16.5 parts and for solubilizer C 15.5 parts).

We claim:

1. A method of solubilizing non-ionic surfactants in an aqueous alkaline solution which comprises adding a solubilizer in a solubilizing effective amount to an aqueous alkaline solution containing a non-ionic surfactant, wherein said solubilizer is a mixture of a long-chain, unsaturated, oligomeric fatty acid with a $C_6$–$C_{12}$ fatty acid wherein the mixture used comprises from 60 to 95 wt % of said $C_6$–$C_{12}$ fatty acid and from 5 to 40 wt % of said long-chain, unsaturated, oligomeric fatty acid.

2. A method as claimed in claim 1, wherein the mixture used comprises from 80 to 90 wt % of said $C_6$–$C_{12}$ fatty acid and from 10 to 20 wt % of said long-chain, unsaturated, oligomeric fatty acid.

3. A method as claimed in claim 1, wherein the $C_6$–$C_{12}$ fatty acid used is 2-ethylhexanoic acid or isononanoic acid.

4. A method as claimed in claim 1, wherein the long-chain, unsaturated oligomeric fatty acid used is a dimeric or trimeric oleic acid or a mixture of such acids.

5. A method as claimed in claim 1, wherein the pH of the aqueous alkaline solution is above 9.

6. A method as claimed in claim 2, wherein the pH of the aqueous alkaline solution is above 9.

7. A method as claimed in claim 3, wherein the pH of the aqueous alkaline solution is above 9.

8. A method as claimed in claim 4, wherein the pH of the aqueous alkaline solution is above 9.

9. An aqueous alkaline composition comprising a non-ionic surfactant and a solubilizing effective amount of a solubilizer, wherein the solubilizer is a mixture of (A) a long-chain, unsaturated, oligomeric fatty acid and (B) a $C_6$–$C_{12}$ fatty acid wherein the solubilizer consist of 5–40 wt % of component (A) and 60 to 95 wt % of component (B).

10. The composition of claim 12, wherein the solubilizer consists of 10–20wt % of component (A) and 80 to 90wt % of component (B).

11. The composition of claim 9, wherein component (B) is 2-ethylhexanoic acid or isononanoic acid.

12. The composition of claim 9, wherein component (A) is a dimeric or trimeric oleic acid or a mixture of such acids.

\* \* \* \* \*